US009268305B2

(12) United States Patent
Rebetez et al.

(10) Patent No.: US 9,268,305 B2

(45) Date of Patent: Feb. 23, 2016

(54) MICROMETRIC ADJUSTMENT OF THE ENDSHAKE OF A TIMEPIECE WHEEL SET

(71) Applicant: ETA SA MANUFACTURE HORLOGERE SUISSE, Grenchen (CH)

(72) Inventors: Olivier Rebetez, Rossemaison (CH); Baptist Wyssbrod, Nidau (CH)

(73) Assignee: ETA SA MANUFACTURE HORLOGERE SUISSE, Grenchen (CH)

(*) Notice: Subject to any disclaimer, the term of this patent is extended or adjusted under 35 U.S.C. 154(b) by 0 days.

(21) Appl. No.: 14/312,845

(22) Filed: Jun. 24, 2014

(65) Prior Publication Data

US 2015/0016231 A1 Jan. 15, 2015

(30) Foreign Application Priority Data

Jul. 10, 2013 (EP) .................................... 13175834

(51) Int. Cl.

| | |
|---|---|
| ***G04B 29/00*** | (2006.01) |
| ***F16C 33/02*** | (2006.01) |
| ***F16C 33/22*** | (2006.01) |
| ***F16C 27/00*** | (2006.01) |
| ***G04B 1/18*** | (2006.01) |
| ***G04B 31/04*** | (2006.01) |
| ***G04B 31/02*** | (2006.01) |
| ***G04B 31/00*** | (2006.01) |
| ***G04B 35/00*** | (2006.01) |
| *G04D 3/00* | (2006.01) |

(52) U.S. Cl.

CPC *G04B 1/18* (2013.01); *G04B 31/00* (2013.01); *G04B 31/02* (2013.01); *G04B 31/04* (2013.01); *G04B 35/00* (2013.01); *G04D 3/0056* (2013.01); *G04D 3/0058* (2013.01)

(58) Field of Classification Search

CPC ........ G04B 31/00; G04B 31/02; G04B 31/04; G04D 3/0056; G04D 3/0058

USPC .................. 368/125, 215, 324; 384/125, 215

See application file for complete search history.

(56) References Cited

U.S. PATENT DOCUMENTS

| | | | | |
|---|---|---|---|---|
| 2,700,273 A * | 1/1955 | Godat | ........................... | 368/326 |
| 2,827,758 A * | 3/1958 | Voumard | ....................... | 368/326 |
| 2,849,855 A * | 9/1958 | Seitz | ............................ | 368/324 |
| 3,050,350 A * | 8/1962 | Loretan | ......................... | 384/225 |
| 3,278,245 A * | 10/1966 | Matthey | ........................ | 384/243 |

(Continued)

FOREIGN PATENT DOCUMENTS

| | | |
|---|---|---|
| CH | 339 136 A | 6/1959 |
| CH | 356 090 A | 7/1961 |

(Continued)

*Primary Examiner* — Amy Cohen Johnson

*Assistant Examiner* — Daniel Wicklund

(74) *Attorney, Agent, or Firm* — Sughrue Mion, PLLC

(57) ABSTRACT

Device for the micrometric endshake adjustment of a timepiece wheel set in an axial direction in relation to a structure, including a pivot bearing for this wheel set defining an axial stop member for this wheel set in this axial direction, and this device includes an adjustment stage of variable thickness in this axial direction, which includes at least one elastic return for pushing a first component provided with pivot drive means operable by a tool and carrying this bearing onto a second component fixed to this structure directly, or via at least one case, and this elastic return means are supported on this structure directly or via at least one case.

14 Claims, 3 Drawing Sheets

(56) References Cited

U.S. PATENT DOCUMENTS

| | | | | |
|---|---|---|---|---|
| 3,478,510 | A * | 11/1969 | Marti | 368/324 |
| 4,192,136 | A | 3/1980 | Robinson | |
| 8,702,301 | B2 * | 4/2014 | Hiraoka et al. | 368/324 |
| 2006/0187767 | A1 * | 8/2006 | Conus et al. | 368/324 |
| 2010/0188941 | A1 * | 7/2010 | Fujieda | 368/324 |
| 2014/0204719 | A1 * | 7/2014 | Rochat et al. | 368/141 |

FOREIGN PATENT DOCUMENTS

| | | | |
|---|---|---|---|
| GB | 586403 | A * | 3/1947 |
| WO | WO 2013044972 | A1 * | 4/2013 |

* cited by examiner

MICROMETRIC ADJUSTMENT OF THE ENDSHAKE OF A TIMEPIECE WHEEL SET

This application claims priority from European Patent Application No. 13175834.4 filed Oct. 7, 2013, the entire disclosure of which is incorporated herein by reference

FIELD OF THE INVENTION

The invention concerns a timepiece movement including at least one structure carrying at least one wheel set, wherein the endshake of said at least one wheel in relation to said at least one structure, along a pivot axis, is adjustable, either by means of an endshake adjustment device including at least one pivot bearing of said wheel set, said at least one bearing defining at least one axial stop member for said wheel set in the axial direction of said axis, said device including at least a first smooth adjustment stage of variable thickness in said axial direction, said first adjustment stage including, on the one hand a first component provided with pivot drive means accessible for driving via a tool and carrying said bearing, and on the other hand, a second component on which said first component is pushed by at least one elastic return means, said second component being fixed to said structure, either directly, or via at least one case, and wherein said elastic return means is supported on said structure, either directly, or via at least one case, or by means of a said equipped case including a said device and including a said case which contains at least one said first adjustment stage and wherein said second component is fixed integral with said case, and wherein said elastic return means is supported within said case.

The invention also concerns a timepiece comprising at least one movement of this type.

The invention concerns the field of timepiece movements, and more specifically the field of the support and adjustment of timepiece wheel sets.

BACKGROUND OF THE INVENTION

The adjustment of the endshake of a timepiece wheel set is a difficult operation, performed by highly qualified personnel, often by the elastic deformation of a structural element, bar or suchlike, or by driving out a jewel and then driving it back in again. Mechanisms rarely incorporate adjustment means, due to the very small ranges of adjustment required, of several micrometers or of several hundredths of a millimeter at most, which are impossible to obtain using conventional micrometric means, such as external-internal threads, because of the operating plays required, which are greater than the required adjustment ranges. Moreover, the space necessarily required for any adjustment mechanism is rarely compatible with that of the timepiece movement.

CH Patent Application No 339136A in the name of BUREAU TECHNIQUE ERARD, describes a timepiece bearing including a concentric arrangement of a member forming the bearing body and a central member carrying at least one jewel hole. The axial position of the central member can be adjusted by imparting a rotation thereon in relation to the bearing body.

CH Patent Application No 356090A in the name of SEITZ & CO describes a bearing with an axial stop member removably mounted in a bearing body including one of the projecting portions which cooperate with helical ramps comprised in a setting forming said axial stop member.

US Patent Application No 4192136A in the name of ROBINSON describes an axial adjustment mechanism in a timepiece, based on the cooperation of helical inclined sectors.

US Patent Application No 2010/188941A1 in the name of SEIKO (FUJIEDA HISASHI) describes a bearing structure, with an entirely axial adjustment configuration, supporting in rotation a front end portion of a wheel arbour in relation to a base body, including: a bearing, a bearing support body carrying the bearing and having a male screw portion on an outer peripheral surface of the wheel arbour, and an adjustment nut provided with a female screw portion in thread engagement with the male screw portion of the bearing support body, adjusted in its movement in the direction of extension of the wheel arbour by the base body, and adapted to adjust the position of the bearing with respect to the direction of extension of the arbour via the bearing support member.

SUMMARY OF THE INVENTION

The invention proposes to integrate a micrometric endshake adjustment function in a timepiece mechanism, with sensitivity such that an adjustment of several micrometers is possible, in a more compact thickness, and adaptable to an existing movement with limited and inexpensive transformations of the structural components housing the wheel set bearings whose endshake requires adjustment. The invention must make endshake adjustment possible without disassembling the pre-assembled assembly, by an external operation using a tool.

The invention therefore concerns a timepiece movement including at least one structure carrying at least one wheel set wherein the endshake of said at least one wheel set with respect to said at least one structure is adjustable, along a pivot axis, either by means of an endshake adjustment device including at least one pivot bearing for said wheel set, said at least one bearing defining at least one axial stop member for said wheel set in the axial direction of said arbour, said device including at least a first smooth adjustment stage of variable thickness in said axial direction, said first adjustment stage including, on the one hand, a first component provided with pivot drive means accessible for driving by a tool and carrying said bearing, and on the other hand, a second component onto which said first component is pushed by at least one elastic return means, said second component being fixed to said structure, either directly, or via at least one case, and wherein said elastic return means is supported on said structure, either directly, or by means of a said equipped case including a said device and including a said case which contains at least one said first adjustment stage and wherein said second component is fixed integral with said case, and wherein said elastic return means is supported in said case, said movement being characterised in that said at least one structure includes a counterbore for receiving at least one said first smooth adjustment stage, wherein said first component and said second component are guided in a bore of said counterbore, said second component being directly secured to said structure and said elastic return means being supported on the bottom of said counterbore.

According to a particular feature of the invention, said elastic return means are supported on said structure via at least one said case, and said second component is fixed to said case in a fixed position in said axial direction and in a fixed angular position.

According a particular feature of the invention, said elastic return means include first means for indexing the angular position thereof in relation to said case, which includes complementary first indexing means, and include second indexing means for the angular positioning thereof in relation to said first component.

According to a feature of the invention, said first component includes a first contact surface progressive in said axial direction according to angular position, and said second component includes a second contact surface progressive in said axial direction according to angular position, cooperating in contact with said first contact surface under the action of said elastic return means.

According to a particular feature of the invention, at least said first contact surface or said second contact surface includes at least one annular helical cam path, tangent over the entire width thereof with every radial line perpendicular to said axial direction.

According to a particular feature of the invention, said first contact surface and said second contact surface each include at least one annular helical cam path tangent over the entire width thereof with every radial line perpendicular to said axial direction.

According to a particular feature of the invention, said first contact surface and said second contact surface each include the same number of cam paths, having the same angular amplitude, and the same cam pitch and are arranged in a complementary profile.

The invention also concerns a timepiece comprising at least one movement of this type.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
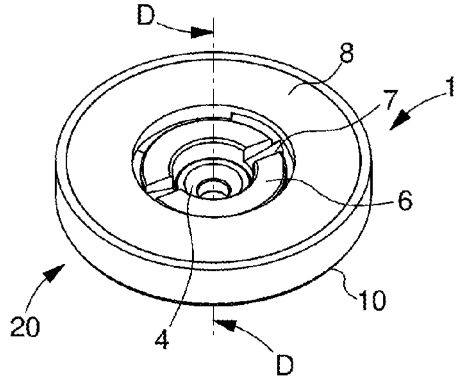
FIG. 1 shows a schematic, perspective view of a micrometric endshake adjustment device for a timepiece wheel set according to the invention, made in the form of a first variant of an equipped case including means for adjusting the position of a bearing in an axial direction, able to be manipulated by a tool in a slot.

The invention concerns the field of the guiding and adjustment of timepiece wheel sets.

The invention is illustrated for the endshake adjustment of a single pivot guide bearing for a wheel set. Naturally, it is possible to equip each pivot guide bearing of a wheel set with a similar mechanism.

The invention also concerns a timepiece movement 100 including at least one structure 3 carrying at least one wheel set 2. The endshake of this at least one wheel set 2 in relation to said at least one structure 3 is adjustable, along a pivot axis D, either by means of a micrometric endshake adjustment device 1, or by means of a said equipped case 20.

Micrometric endshake adjustment device 1 includes at least one pivot bearing 4 for wheel set 2. Said at least one bearing 4 defines at least one axial stop member for said wheel set 2 in the axial direction of axis D. Device 1 includes at least one smooth adjustment stage 5 (i.e. with no internal or external thread) of variable thickness in said axial direction. Said adjustment stage 5 includes, on the one hand a first component 6 provided with pivot drive means 7 accessible for driving by a tool and carrying a bearing 4, and on the other hand, a second component 8 onto which said first component 6 is pushed by at least one elastic return means 9. This second component 8 is fixed to structure 3, either directly or by means of at least one case 10. Elastic return means 9 are supported on structure 3 either directly, or by means of at least one case 10.

Equipped case 20 includes a said device 1 and includes a said case 10 which contains at last one first adjustment stage 5 and wherein second component 8 is fixed integral with case 10, and wherein elastic return means 9 is supported inside case 10.

According to the invention, said at least one structure 3 includes a counterbore 30 for receiving at least one said first smooth adjustment stage 5, wherein first component 6 and second component 8 are guided in a bore 32 of said counterbore 30, said second component 8 being directly secured to structure 3, and elastic return means 9 are supported on the bottom 31 of counterbore 30.

Thus, a timepiece wheel set 2 pivots about a pivot axis D in relation to a carrier structure 3. Device 1 for the micrometric endshake adjustment of wheel set 2 in relation to structure 3 includes at least one pivot bearing 4 for wheel set 2. This bearing 4 defines at least one axial stop member for wheel set 2 in the axial direction of axis D. “Bearing” 4 means, in the broad sense, the function of guiding wheel set 2: the guiding of the actual pivoting, any axial support, any anti-shock damper, said bearing 4 is in one or more portions, and may, in particular, be made in a single piece, in silicon, “Liga” or “MEMS” technology, incorporating radial guiding, axial support and shock damping.

According to the invention, device 1 includes at least a first adjustment stage 5, which is smooth (free of any internal or external thread), and which has variable thickness in the axial direction, according to the relative adjustment of the components comprised therein: on the one hand, a first component 6, provided with pivot drive means 7 accessible for driving by a tool (screwdriver or wrench or suchlike), and carrying bearing 4, and on the other hand, a second component 8 onto which first component 6 is pushed by at least one elastic return means 9.

Figure 6:
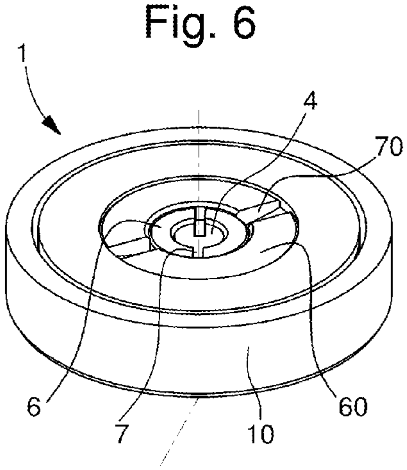
FIG. 6 shows a schematic, perspective view of a second variant of an equipped case with two adjustment stages.
Figure 7:
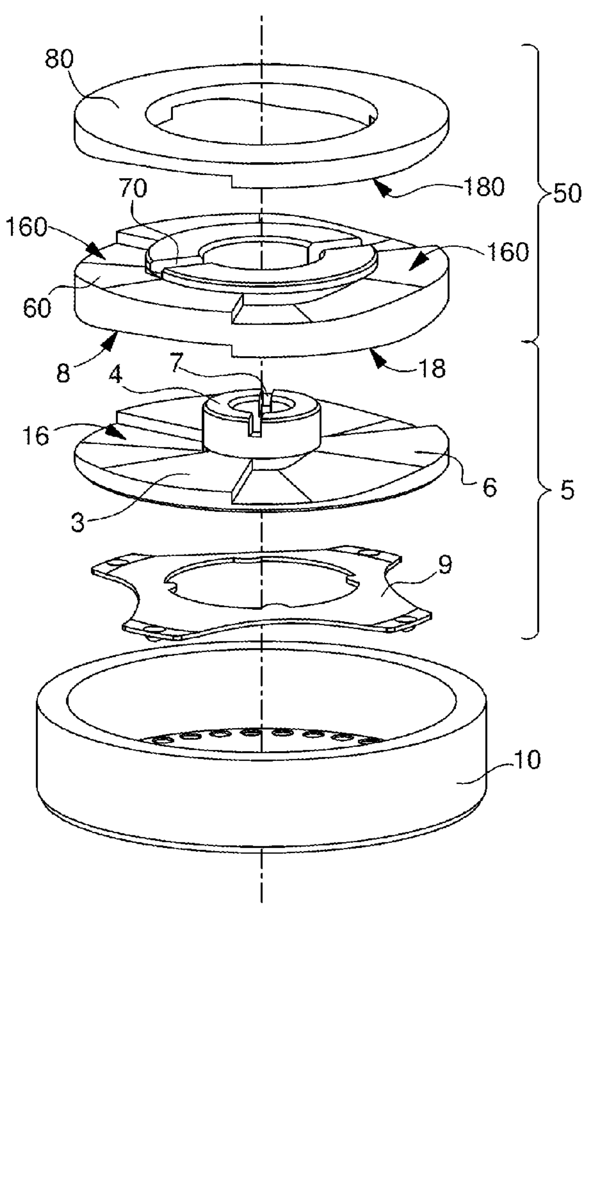
FIG. 7 shows a schematic, perspective, exploded view of the components of the equipped case of FIG. 6.
Figure 11:
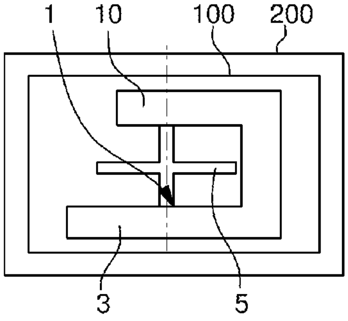
FIG. 11 represents, in the form of block diagrams, a timepiece including a timepiece movement with a structure carrying a wheel set, whose endshake with respect to said structure is adjustable by means of a micrometric adjustment device according to the invention.
Figure 8:
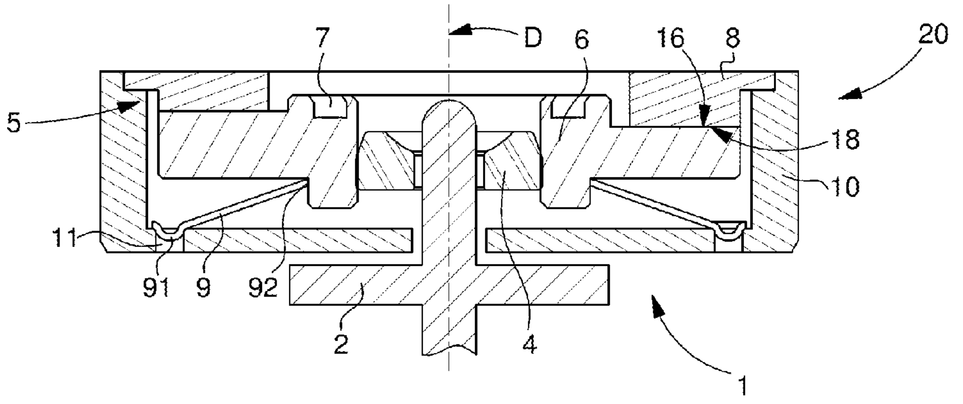
FIG. 8 shows a schematic cross-section of the equipped case of FIG. 1 through the pivot axis of the wheel set.
Figure 9:
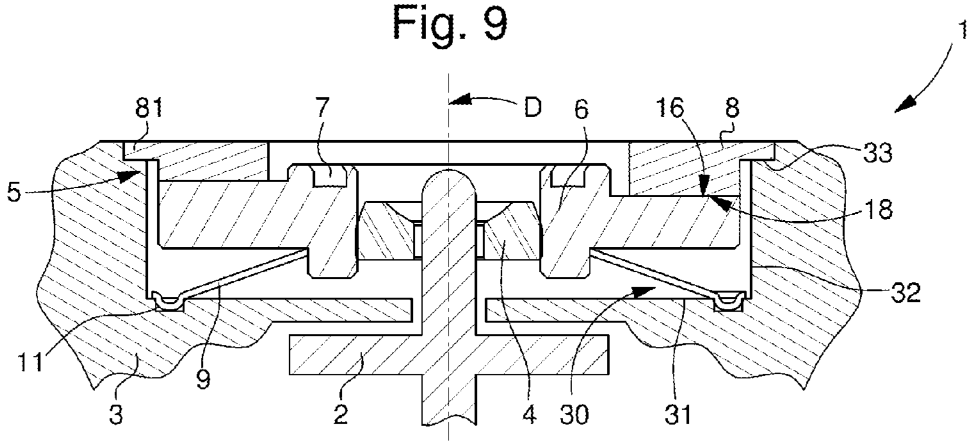
FIG. 9 shows a schematic cross-section, through the pivot axis of the wheel set, of a structure including a counterbore incorporating the bearing endshake adjustment means according to the invention.

This second component 8 is fixed to structure 3, either directly as in the FIG. 9 variant, or via at least one case 10 as in FIGS. 1, 2, 6 and 8. It is also possible to envisage fixing said component 8 via at least one other adjustment stage 50 of variable thickness in the axial direction as in FIGS. 6 and 7, provided that each of the stages can be angularly locked.

Elastic return means 9 are supported on structure 3, either directly as in the FIG. 9 variant, or via at least one case 10 as in FIGS. 1, 2 and 6 to 8.

In the case of FIGS. 1, 2 and 6 to 8, elastic return means 9 are thus supported on structure 3 via at least one case 10, and second component 8 is fixed to said case 10 in a fixed position in the axial direction and in a fixed angular position.

Figure 2:
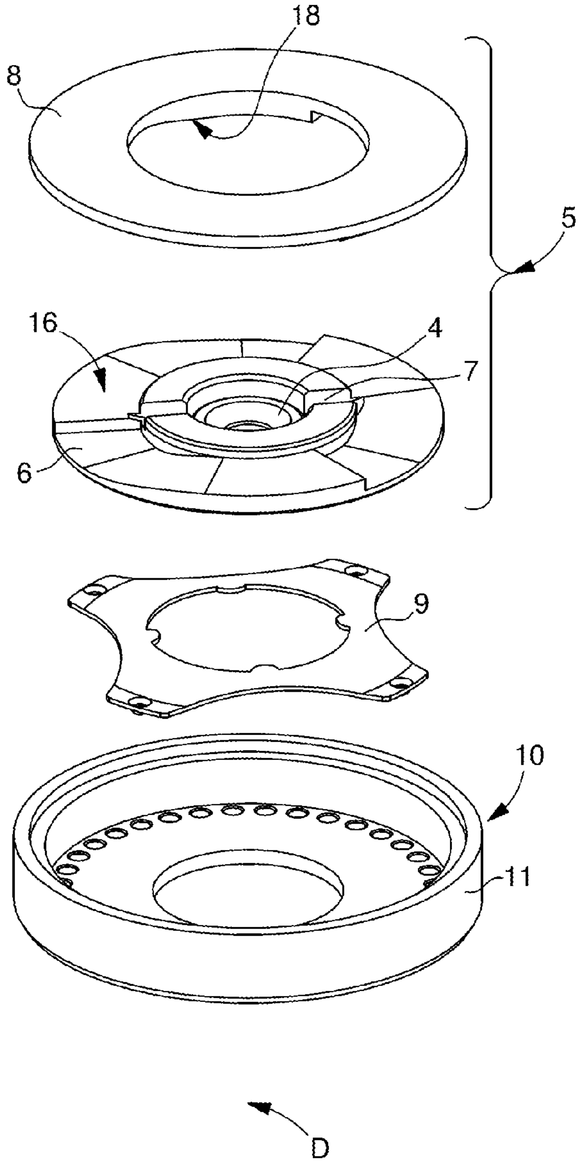
FIG. 2 shows a schematic, perspective, exploded view of the components of the equipped case of FIG. 1.
Figure 3:
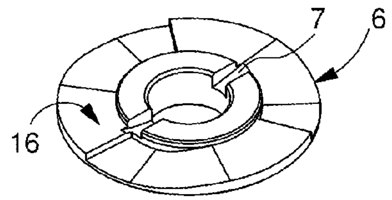
FIG. 3 shows a schematic, perspective view of a first component including a first progressive contact surface formed of three helical cam sections.
Figure 4:
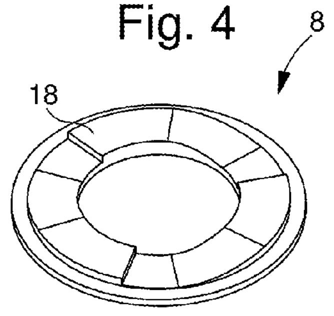
FIG. 4 shows a schematic, perspective view of a second component including a second progressive contact surface formed of three helical cam sections, complementary to the first contact surface of FIG. 3.
Figure 5:
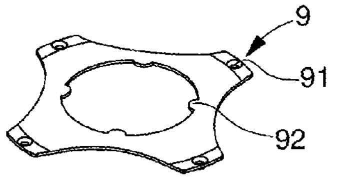
FIG. 5 shows a schematic, perspective view of at least one elastic return means, made in the form of a stamped spring pushing the first component of FIG. 3 onto the second component of FIG. 4, which together form a first endshake adjustment stage.

In a particular embodiment, as seen in FIGS. 2, 5 and 9, elastic return means 9 (made, in particular, in the form of a stamped spring) include first indexing means 91, for example peripheral claws or notches, for the angular positioning thereof with respect to case 10, which includes complementary first indexing means 11, for example notches or respectively bosses. Elastic return means 9 further includes second indexing means 92, such as lugs or notches for the angular positioning thereof with respect to first component 6, which includes opposite complementary means, which are not illustrated so as not to overload the Figures, such as notches or lugs respectively.

In a preferred embodiment illustrated in the Figures, the first component 6 includes a first contact surface 16 progressive in the axial direction according to angular position, and second component 8 includes a second contact surface 18 progressive in the axial direction according to angular position. This second contact surface 18 cooperates in contact with first contact surface 16 under the action of at least one elastic return means 9.

It is understood that, according to the relative angle formed by first component 6 and second component 8, the contact surfaces correspond to a specific height, thus the overall thickness of stage 5 formed by stacking these two components depends upon the angular offset between them. Advantageously, the contact surfaces are devised such that a given offset angle corresponds to a specific total thickness value, which provides reproducibility, and allows, if required, the visible face of second component 8 to be graduated opposite drive means 7 (a straight radial slot here) to indicate to the user the resulting endshake variation.

In a preferred variant illustrated in the Figures, at least the first contact surface 16 or second contact surface 18 includes at least one annular helical cam path, tangent over the entire width thereof with every radial line perpendicular to the axial direction. The opposing contact surface may include a relief element such as another cam, a series of steps, or a series of bosses or notches, or suchlike. Further, each of the contact surfaces can be made according to one of these examples, but the variant with a very fine pitch cam is preferred in the case of the invention, since it allows for continuous adjustment, very low axial variation for a large angular clearance and thus high sensitivity. Further, the low cam slope ensures there is sufficient friction to hold the cam in position. The friction provided by elastic return means 9 fulfils the same position retaining function.

In the preferred variant of the Figures, both first contact surface 16 and second contact surface 18 include at least one annular helical cam path, tangent over the entire width thereof with every radial line perpendicular to the axial direction.

More specifically, the first contact surface 16 and second contact surface 18 each include the same number of cam paths (three here), with the same angular amplitude, and of the same cam pitch, and are arranged in a complementary profile. These cams with small slopes also have a small thickness, which is favourable for space saving and integrating endshake adjustment device 1 in a flat or ultra flat movement.

Figure 10:
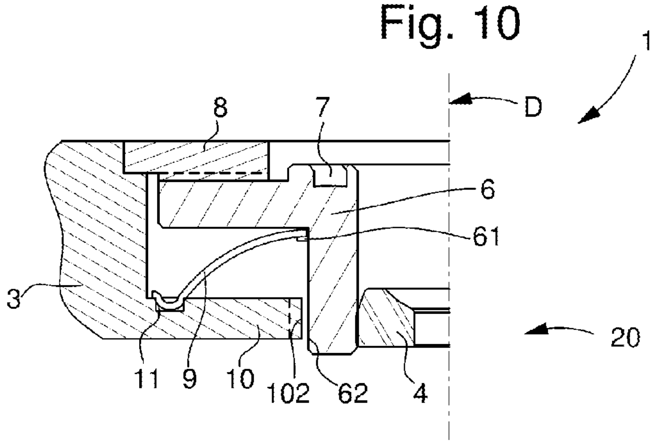
FIG. 10 shows, in a similar manner to FIG. 8, a partial view of an advantageous embodiment of the invention.

FIG. 10 shows a detail of a particular embodiment, wherein return means 9 is a stamped spring in a spherical calotte, and wherein first component 6 includes a guide surface 62 which cooperates with an opposing surface 102 of case 10 for radial guiding. First component 6 also includes housings 61 for receiving and stopping the rotation of lugs 92 of spring 9 forming indexing means 92, with housings 61 forming the complementary indexing means.

The invention also makes it possible to combine several adjustment stages, for example to enjoy a broader adjustment range, while allowing for an adjustment with values of several micrometers. In that case, second component 8 is fixed to structure 3 via at least one other adjustment stage 50 of variable thickness in the axial direction. The composition of this other stage 50 is preferably similar to that of first adjustment stage 5 and includes, on the one hand a third component 60 provided with pivot drive means 70 accessible for driving by a tool, said third component 60 being integral with second component 8 and including a third contact surface 160 opposite second contact surface 18, and on the other hand, a fourth component 80 carrying a fourth contact surface 180 cooperating with third contact surface 160, said fourth component 80 being secured to structure 3, either directly, or via at least one other adjustment stage. FIGS. 6 and 7 illustrated this type of assembly with two stages 5 and 50 with concentric adjustment means 7 and 70, accessible to the operator on the same side.

The invention further concerns an equipped case 20 including a device 1 of this type. It preferably includes a case 10 of this type, which contains at least one said first adjustment stage 5 and wherein second component 8 is fixed integral with case 10, and wherein elastic return means 9 are supported inside case 10. This equipped case 20 forms a complete micrometric adjustment means, of small thickness, which is easy to house in a bore or counterbore of a structure 3. It forms a particular cabochon, integrating bearing 4 and all or part of the functions of radial guiding, axial bearing and shock absorption, and which has the advantage of providing axial adjustment, within a similar sized space, barely greater than that of a conventional cabochon. Naturally, case 10 may include an external shoulder for assembly in a smooth bore and supported on a face of a plate or of a bar. In the case of assembly in a counterbore of the structure, case 10 may have a cylindrical external diameter, and be driven or fixed in position by any method known to the watchmaker.

The invention also concerns a timepiece movement 100 including at least one structure 3 carrying at least one wheel set 2. The endshake of this at least one wheel set 2 with respect to said at least one structure 3 is adjustable by means of a micrometric adjustment device 1, or by means of a said equipped case 20.

In the embodiment illustrated in FIG. 9, movement 100 includes a structure 3, which includes a counterbore 30 for receiving at least one first adjustment stage 5 free of internal and external threads. First component 6 and second component 8 of stage 5 are guided in a bore 32 of counterbore 30, second component 8 being directly fixed to structure 3, and elastic return means 9 being supported on the bottom 31 of counterbore 30. In a particular embodiment as illustrated, second component 8 includes a collar 81 fixed integral with a shoulder 33 comprised in counterbore 30.

The invention also concerns a timepiece 200 including at least one such movement 100.

The utilisation of equipped cases with different adjustment ranges allows adaptation to several types of case (with a narrow or conversely very wide adjustment range) for the same sized external space. The first and second components, and the case, can be made by micro injection, or "MEMS" type technologies, and do not require any machining, whereas the spring forming the elastic return means is advantageously formed and cut out by stamping. The only machining required is the machining of the structure for receiving the device according to the invention.

In short, the invention achieves the objects of high sensitivity, ease of adjustment accessible to watchmaking personnel with ordinary qualifications, compactness and reduced production costs. The invention makes it possible to modify an existing calibre easily, simply by machining a bore or a counterbore in a plate or bar to incorporate the endshake adjustment function and achieve improved chronometric performance and therefore enhancement of the timepiece incorporating the calibre concerned.

What is claimed is:

1. A timepiece movement including at least one structure carrying at least one wheel set, wherein the endshake of at least one wheel set is adjustable in relation to said at least one structure, along a pivot axis, either by means of a micrometric endshake adjustment device including at least one pivot bearing of said wheel set, said at least one bearing defining at least one axial stop member for said wheel set in said axial direction of said axis, said device including at least a first smooth adjustment stage of variable thickness in said axial direction, said first adjustment stage including, on the one hand, a first component provided with pivot drive means accessible for driving by a tool and carrying said bearing, and on the other hand, a second component onto which said first component is pushed by at least one elastic return means, said second component being directly fixed to said structure, and wherein said elastic return means are supported on said structure, wherein said at least one structure includes a counterbore for receiving at least one said first smooth adjustment stage, wherein said first component and said second component are guided in a bore of said counterbore, said second component being directly fixed to said structure, and said elastic return means being supported on the bottom of said counterbore, and wherein said second component is fixed to said structure via at least one other smooth adjustment stage of variable thickness in said axial direction, and which includes, on the one hand, a third component provided with pivot drive means accessible for driving by a tool, said third component being integral with said second component and including a third contact surface opposite said second contact surface, and on the other hand, a fourth component onto which said third component is pushed by said at least one elastic return means, said fourth component carrying a fourth contact surface cooperating with said third contact surface, said fourth component being fixed to said structure, either directly, or via at least one other adjustment stage.

2. The movement according to claim 1, wherein said first component includes a first contact surface progressive in said axial direction according to angular position, and said second component includes a second contact surface progressive in said axial direction according to angular position, cooperating in contact with said first contact surface under the action of said elastic return means.

3. The movement according to claim 2, wherein at least said first contact surface or said second contact surface includes at least one annular helical cam path surface, tangent over the entire width of said annular helical cam path surface with every radial line perpendicular to said axial direction.

4. The movement according to claim 3, wherein at least said first contact surface and said second contact surface each include at least one annular helical cam path surface, tangent over the entire width of said annular helical cam path surface with every radial line perpendicular to said axial direction, and wherein said first contact surface and said second contact surface each include the same number of cam paths surfaces, having the same angular amplitude, and the same cam pitch and are arranged in a complementary profile.

5. The movement according to claim 1, wherein said second component includes a collar fixed integral with a shoulder comprised in said counterbore.

6. A timepiece including at least one movement according to claim 1.

7. A timepiece movement including at least one structure carrying at least one wheel set, wherein the endshake of at least one wheel set is adjustable in relation to said at least one structure, along a pivot axis, by means of an equipped case including a micrometric endshake adjustment device including at least on pivot bearing of said wheel set, said at least one bearing defining at least one axial stop member for said wheel set in said axial direction of said axis, said device including at least a first smooth adjustment stage of variable thickness in said axial direction, said first adjustment stage including, on the one hand, a first component onto which said first component is pushed by at least one elastic return means, said second component being fixed to said structure by means of said case, and said elastic return means being supported on said structure via said case, and said case containing at least a first said adjustment stage and wherein said second component is fixed integral with said case, and wherein said elastic return means are supported inside said case, wherein said at least one structure includes a counterbore for receiving at least one said first smooth adjustment stage, wherein said first component and said second component are guided in a bore of said counterbore, said second component being directly fixed to said structure, and said elastic return means being supported on the bottom of said counterbore, and wherein said second component is fixed to said structure via at least one other smooth adjustment stage of variable thickness in said axial direction, and which includes, on the one hand, a third component provided with pivot drive means accessible for driving by a tool, said third component being integral with said second component and including a third contact surface opposite said second contact surface, and on the other hand, a fourth component onto which said third component is pushed by said at least one elastic return means, said fourth component carrying a fourth contact surface cooperating with said third contact surface, said fourth component being fixed to said structure, either directly, or via at least one other adjustment stage.

8. The movement according to claim 7, wherein said elastic return means are supported on said structure via said case, and wherein said second component is fixed to said case in a fixed position in said axial direction and in a fixed angular position.

9. The movement according to claim 8, wherein said elastic return means include first means for indexing the angular position thereof in relation to said case, which includes complementary first indexing means, and include second indexing means for the angular positioning thereof in relation to said first component.

10. The movement according to claim 7, wherein said first component includes a first contact surface progressive in said axial direction according to angular position, and said second component includes a second contact surface progressive in said axial direction according to angular position, cooperating in contact with said first contact surface under the action of said elastic return means.

11. The movement according to claim 10, wherein at least said first contact surface or said second contact surface includes at least one annular helical cam path surface, tangent over the entire width of said annular helical cam path surface with every radial line perpendicular to said axial direction.

12. The movement according to claim 11, wherein at least said first contact surface and said second contact surface each include at least one annular helical cam path surface, tangent over the entire width of said annular helical cam path surface with every radial line perpendicular to said axial direction, and wherein said first contact surface and said second contact surface each include the same number of cam paths surfaces, having the same angular amplitude, and the same cam pitch and are arranged in a complementary profile.

13. The movement according to claim 7, wherein said second component includes a collar fixed integral with a shoulder comprised in said counterbore.

14. A timepiece including at least one movement according to claim 7.

* * * * *